United States Patent
Wu et al.

(10) Patent No.: US 10,271,330 B2
(45) Date of Patent: Apr. 23, 2019

(54) INFORMATION TRANSMISSION METHOD AND APPARATUS AND SYSTEM

(71) Applicant: FUJITSU LIMITED, Kawasaki-shi, Kanagawa (JP)

(72) Inventors: Lianhai Wu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/017,509

(22) Filed: Jun. 25, 2018

(65) Prior Publication Data

US 2018/0310303 A1    Oct. 25, 2018

Related U.S. Application Data

(63) Continuation of application No. PCT/CN2016/070161, filed on Jan. 5, 2016.

(51) Int. Cl.
*H04W 72/04* (2009.01)
*H04W 72/08* (2009.01)

(52) U.S. Cl.
CPC ....... *H04W 72/0446* (2013.01); *H04W 72/08* (2013.01)

(58) Field of Classification Search
None
See application file for complete search history.

(56) References Cited

U.S. PATENT DOCUMENTS

| 8,767,629 | B2 | 7/2014 | Li et al. |
| 9,148,879 | B2 | 9/2015 | Li et al. |
| 2010/0082513 | A1 | 4/2010 | Liu |
| 2013/0028211 | A1 | 1/2013 | Li et al. |
| 2014/0247789 | A1 | 9/2014 | Li et al. |

(Continued)

FOREIGN PATENT DOCUMENTS

| CN | 102014506 A | 4/2011 |
| CN | 104869527 A | 8/2015 |

OTHER PUBLICATIONS

3GPP TSG RAN WG Meeting #83, R1-156978 System level consideration and evaluation for V2V communication (Year: 2015).*

(Continued)

*Primary Examiner* — Edan Orgad
*Assistant Examiner* — Emmanuel K Maglo
(74) *Attorney, Agent, or Firm* — Myers Wolin, LLC (57) ABSTRACT

Embodiments of this disclosure provide an information transmission method and apparatus and a system. The method is applicable to a terminal, the terminal being configured with a first type of resource pool for transmitting first type of information and a second type of resource pool for transmitting second type of information; wherein, the method includes: when the terminal is triggered to transmit information, it selects resources for transmitting the information from the configured first type of resource pool or second type of resource pool according to an attribute of the information; and transmits the information by using the selected resources. With the embodiments of this disclosure, it may be ensured that the terminal will not miss detecting a type of information due to a semi-duplexing problem, such as detecting resources for transmitting emergency information, thereby increasing utilization of resources, and improving reliability of V2V communications.

11 Claims, 4 Drawing Sheets

(56) References Cited

U.S. PATENT DOCUMENTS

| | | | |
|---|---|---|---|
| 2017/0332207 A1* | 11/2017 | Sheng | H04W 4/027 |
| 2017/0332352 A1* | 11/2017 | Sheng | H04L 67/12 |
| 2018/0092065 A1* | 3/2018 | Sheng | H04W 74/006 |
| 2018/0098369 A1* | 4/2018 | Yasukawa | H04W 48/10 |
| 2018/0132086 A1 | 5/2018 | Zhang et al. | |
| 2018/0160418 A1* | 6/2018 | Luo | H04W 72/04 |
| 2018/0213550 A1* | 7/2018 | Li | H04W 72/1263 |

OTHER PUBLICATIONS

International Search Report issued for corresponding International Patent Application No. PCT/CN2016/070161, dated Oct. 9, 2016, with an English translation.

Written Opinion of the International Searching Authority issued for corresponding International Patent Application No. PCT/CN20161070161, dated Oct. 9, 2016, with an English translation.

* cited by examiner

INFORMATION TRANSMISSION METHOD AND APPARATUS AND SYSTEM

CROSS REFERENCE TO RELATED APPLICATIONS

This application is a continuation application of International Application PCT/CN2016/070161 filed on Jan. 5, 2016, the entire contents of which are incorporated herein by reference.

FIELD

This disclosure relates to the field of communications technologies, and in particular to an information transmission method and apparatus and a system.

BACKGROUND

Figure 1:
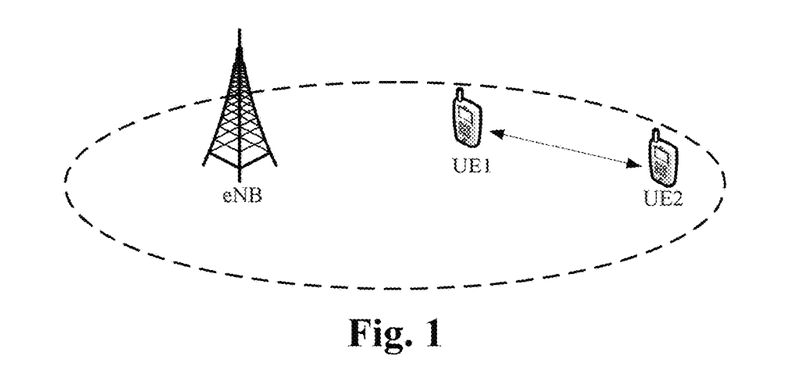
FIG. 1 is a schematic diagram of a scenario of the sidelink communications.
Figure 2:
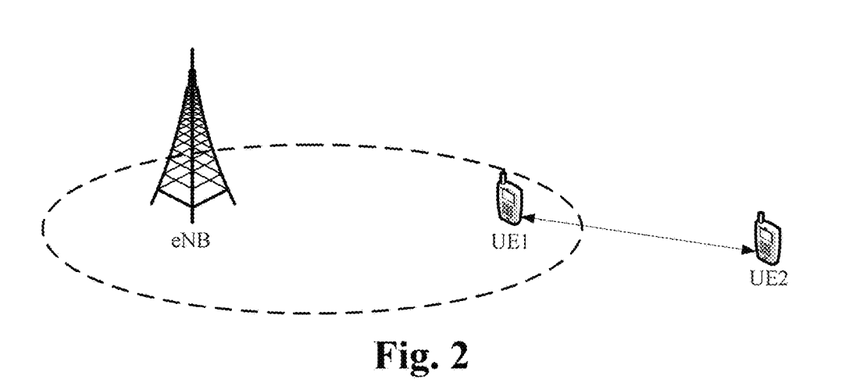
FIG. 2 is schematic diagram of another scenario of the sidelink communications.
Figure 3:
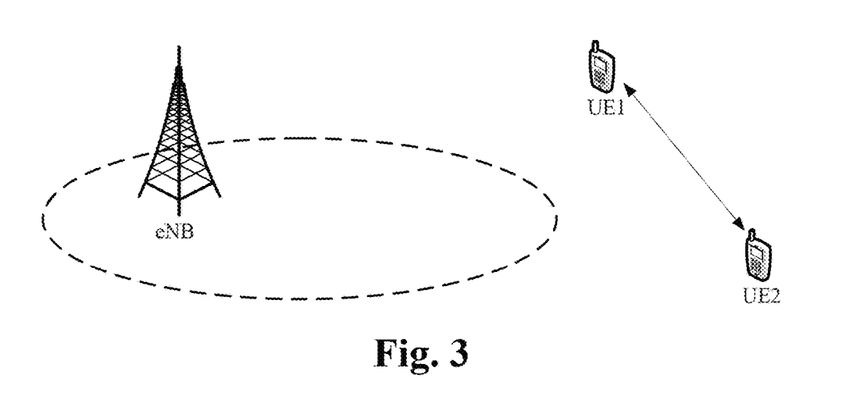
FIG. 3 is a schematic diagram of a further scenario of the sidelink communications.

A sidelink communications mode refers to that a packet needs not to pass a core network and an eNB, and a communications link may be directly established between UE1 and UE2 for communications. A sidelink discovery process is generally performed before performing sidelink communications. For example, UE2 needs first to discover whether UE1 is near before transmitting information to UE1 in the sidelink communications mode. FIG. 1 is a schematic diagram of discovering or establishing the sidelink communications, in which a case where two UEs (UE1 and UE2) are under coverage of an eNB is shown. FIG. 2 is another schematic diagram of discovering or establishing the sidelink communications, in which a case where one UE (UE1) under coverage of an eNB and another UE (UE2) not under the coverage of the eNB is shown. And FIG. 3 is a further schematic diagram of discovering or establishing the sidelink communications, in which a case where two UEs (UE1 and UE2) not under coverage of an eNB is shown.

Figure 4:
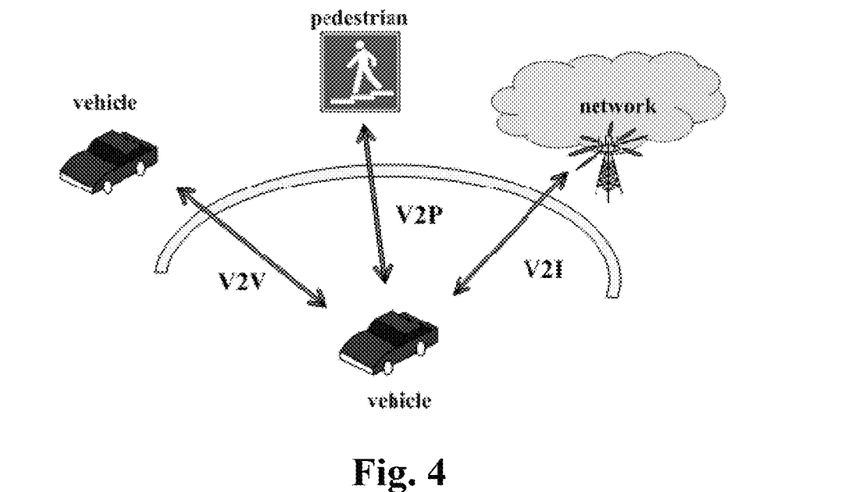
FIG. 4 is a schematic diagram of a scenario of the V2X.

V2X (vehicle-to-everything) communications is one of sidelink communications modes, which includes three types of communications modes: V2V (vehicle-to-vehicle) communications, V2I (vehicle-to-infrastructure) communications and V2P (vehicle-to-pedestrian) communications. FIG. 4 is a schematic diagram of these three types of communications modes. In a V2V scenario, two terminals with a relatively short distance therebetween may transmit information on V2V after being authorized by an E-UTRAN (evolved UNTS terrestrial radio access network). The information on V2V may include information on a location, and a terminal attribute, etc. A size of the information on V2V may also be variable. Transmission of the information on V2V may be performed in a direct manner, that is, it may be transmitted by no infrastructure; or, it may be transmitted via an infrastructure, such as an RSU (road side unit).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Figure 5:
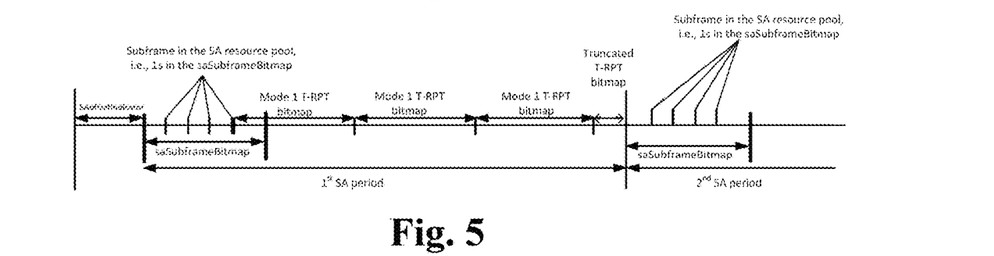
FIG. 5 is a schematic diagram of a resource pool used for sidelink direct communications.

It was found by the inventors that before performing sidelink transmission, a terminal will be configured with a resource pool. A scheduling assignment (SA) resource pool in the resource pool is used for transmitting physical sidelink control channels (PSCCHs). The PSCCHs may carry sidelink control information (SCI) format 0 information. According to existing protocols, the SCI format 0 information will be transmitted repeatedly twice at two different subframes in the SA resource pool, as shown in FIG. 5. In the scenario shown in FIG. 5, the control information and the data are located in different subframe resources; however, the control information and the data may also be located in the same subframe for transmission. In a scenario where a terminal needs to transmit emergency information, the emergency information needs to be received by a receiver end within a very short period of time, such as 20 milliseconds. However, due to semi-duplexing, some receiver ends are unable to successfully receive the emergency information.

In order to solve the above problem, embodiments of this disclosure provide an information transmission method and apparatus and a system.

According to a first aspect of the embodiments of this disclosure, there is provided an information transmission apparatus, applicable to a terminal, the terminal being configured with a first type of resource pool for transmitting first type of information and a second type of resource pool for transmitting second type of information; wherein, the apparatus includes:

a selecting unit configured to, when the terminal is triggered to transmit information, select resources for transmitting the information from the configured first type of resource pool or second type of resource pool according to an attribute of the information; and a transmitting unit configured to transmit the information by using the selected resources.

According to a second aspect of the embodiments of this disclosure, there is provided a terminal device, including the information transmission apparatus as described in the first aspect.

According to a third aspect of the embodiments of this disclosure, there is provided an information transmission method, applicable to a terminal, the terminal being configured with a first type of resource pool for transmitting first type of information and a second type of resource pool for transmitting second type of information; wherein, the method includes:

selecting, when the terminal is triggered to transmit information, resources for transmitting the information from the configured first type of resource pool or second type of resource pool according to an attribute of the information; and transmitting the information by using the selected resources.

According to a fourth aspect of the embodiments of this disclosure, there is provided a communications system, including a transmitter end and a receiver end, wherein, the transmitter end is configured with a first type of resource pool for transmitting first type of information and a second type of resource pool for transmitting second type of information, and when the transmitter end is triggered to transmit information, it selects resources from the configured first type of resource pool or second type of resource pool according to an attribute of the information, and transmits the information by using the selected resources.

An advantage of the embodiments of this disclosure exists in that with the embodiments of this disclosure, it may be ensured that the terminal will not miss detecting a type of information due to a semi-duplexing problem, such as detecting resources for transmitting emergency information, thereby increasing utilization of resources, and improving reliability of communications.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings, and these embodiments are illustrative only, and are not intended to limit this disclosure.

Embodiment 1

Figure 6:
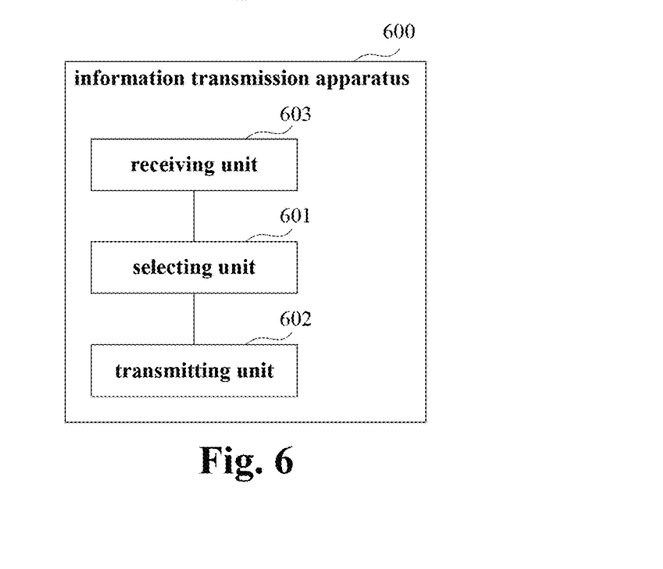
FIG. 6 is a schematic diagram of a structure of the information transmission apparatus of an embodiment of this disclosure.

The embodiment of this disclosure provides an information transmission apparatus, applicable to a terminal, such as UE1 or UE2 in the scenarios shown in FIGS. 1-3, UE1 and UE2 may be vehicles in the scenario shown in FIG. 4. In this embodiment, the terminal is configured with a first type of resource pool for transmitting first type of information and a second type of resource pool for transmitting second type of information. FIG. 6 is a schematic diagram of a structure of the apparatus. Referring to FIG. 6, an information transmission apparatus 600 includes a selecting unit 601 and a transmitting unit 602.

In this embodiment, when the terminal is triggered to transmit information, the selecting unit 601 selects resources for transmitting the information from the configured first type of resource pool or second type of resource pool according to an attribute of the information. And the transmitting unit 602 transmits the information by using the resources selected by the selecting unit 601.

In this embodiment, the terminal is configured with multiple resource pools for transmitting information. In the scenario of V2V communications shown in FIG. 4, the terminal here refers to a vehicle performing V2V communications, and the information here refers to V2V-related information. In such a scenario, in the above multiple resource pools, resource pools having small periods are used for transmitting emergency information, and other resource pools are used for transmitting non-emergency information. For the sake of simplicity, the emergency information is referred to as the first type of information, the non-emergency information is referred to as the second type of information, resource pools used for transmitting the first type of information are referred to as the first type of resource pools (containing one or more resource pools), and resource pools used for transmitting the second type of information are referred to as the second type of resource pools (containing one or more resource pools). It should be noted that the above definitions are given by taking a V2V communications scenario as an example, and it may be understood by those skilled in the art that in other scenarios, the first type of information, the second type of information, the first type of resource pools and the second type of resource pools may be redefined as needed, and this embodiment is not limited thereto.

In this embodiment, assuming that n resource pools are configured for the terminal, in the configuration information, which resource pool or resource pools (referred to as the first type of resource pools) is/are used for transmitting the first type of information, such as the above-described emergency information, and which resource pool or resource pools (referred to as the second type of resource pools) is/are used for transmitting the second type of information, such as the above-described non-emergency information, may be indicated.

In this embodiment, for a terminal under coverage of an eNB, such as UE1 and UE2 in the scenario shown in FIG. 1 or UE1 in the scenario shown in FIG. 2, the above multiple resource pools may be configured via radio resource control (RRC) signaling, and for a terminal out of the coverage of the eNB, such as UE2 in the scenario shown in FIG. 2 or UE1 and UE2 in the scenario shown in FIG. 3, the above multiple resource pools may be configured in advance, and a particular configuration manner is not limited in this embodiment.

In this embodiment, as shown in FIG. 6, the apparatus 600 may further include a receiving unit 603 configured to receive a triggering command from an application layer, the triggering command triggering an access stratum of the terminal to transmit the information, and indicating whether the attribute of the information is the first type of information or the second type of information. In this embodiment, an application layer of the terminal transmitting the triggering command is taken as an example. However, this embodiment is not limited thereto, and in particular implementation, a function of the triggering command may also be implemented by one or more pieces of other information. In this embodiment, the application layer triggers the access stratum to transmit the information, and at the same time, indicates whether the information is the first type of information or the second type of information. That is, the receiving unit 603, the selecting unit 601 and the transmitting unit 602 are all located in the access stratum (AS), and once the receiving unit 603 receives the triggering command from the application layer, the selecting unit 601 may select corresponding resources from a corresponding resource pool, and the transmitting unit 602 may transmit the information by using the resources selected by the selecting unit 601.

In this embodiment, when the terminal is triggered to transmit the first type of information, the selecting unit 601 may select the resources for transmitting the first type of information from the configured first type of resource pools, select a predetermined number of consecutive valid subframes from selectable subframe resources and take them as the selected resources. For example, when information needing to be transmitted by the terminal is emergency information, the selecting unit 601 may select resources from a resource pool configured specific for transmission of emergency information. For example, it may select m consecutive valid subframes from the selectable subframe resources, for use in transmitting the emergency information. Hence, a transmission efficiency is improved, latency is reduced, and reliability of communications is improved.

In this embodiment, when the terminal is triggered to transmit the second type of information, the selecting unit 601 may select the resources for transmitting the second type of information from the configured second type of resource pools. For example, when information needing to be transmitted by the terminal is non-emergency information, the selecting unit 601 may select resources from a resource pool configured specific for transmission of non-emergency information, for use in transmitting the non-emergency information.

In this embodiment, resources in the first type of resource pool and resources in the second type of resource pool may overlap or not. When they do not overlap, the selecting unit 601 may select resources according to a current protocol. And when they overlap, the resources selected by the selecting unit 601 from the configured second type of resource pool for transmitting the second type of information do not consecutively occupy in a time domain the predefined number of consecutive valid subframes in the first type of resource pool. For example, when the selecting unit 601 selects resources from the resource pool used for transmitting non-emergency information, the selected resources should not consecutively occupy in the time domain m consecutive valid subframes in the resource pool used for transmitting emergency information; and in view of a receiver end, for subframe resources in the resource pool used for transmitting emergency information, it should be avoided that the subframe resources do not receive information in m consecutive valid subframes, so that it may be ensured that emergency information can be transmitted in at least one subframe.

Selection manners of the selecting unit 601 shall be described below respectively by way of two implementations.

In one implementation, when the selecting unit 601 selects the resources for transmitting the second type of information from the configured second type of resource pools, selection of resources in the second type of resource pools occupying a predetermined number of consecutive valid subframes in the first type of resource pools in the time domain needs to be avoided. That is, in this implementation, the above problem is avoided at a stage of resource selection. For example, at the stage of resource selection, the selecting unit 601 avoids selecting resources in the resource pools for transmitting non-emergency information which occupy m consecutive valid subframes in the resource pools for transmitting emergency information in the time domain.

In another implementation, after the selecting unit 601 selects the resources for transmitting the second type of information from the configured second type of resource pools, when the selected resources occupy a predetermined number of consecutive valid subframes in the first type of resource pools in the time domain, a part of the predetermined number of consecutive valid subframes are abandoned. That is, in this implementation, the above problem is avoided after the resource selection. In this implementation, abandoning a part refers to that this part of subframes are not used as transmission resources of the above second type of information. And in this implementation, which transmission resources are abandoned is determined by the terminal.

In this embodiment, after the selecting unit 601 selects the resources for transmitting the above information, the transmitting unit 602 may use the selected resources to transmit the above information, and a particular transmission manner is not limited in this disclosure.

With the apparatus of this embodiment, it may be ensured that the terminal will not miss detecting a type of information due to a semi-duplexing problem, such as detecting resources for transmitting emergency information, thereby increasing utilization of resources, and improving reliability of communications.

Embodiment 2

The embodiment of this disclosure provides a terminal device, such as UE1 or UE2 in the scenarios shown in FIGS. 1-3, UE1 and UE2 may be vehicles in the scenario shown in FIG. 4.

In this embodiment, the terminal device is configured with a first type of resource pool for transmitting first type of information and a second type of resource pool for transmitting second type of information, and includes the information transmission apparatus as described in Embodiment 1.

Figure 7:
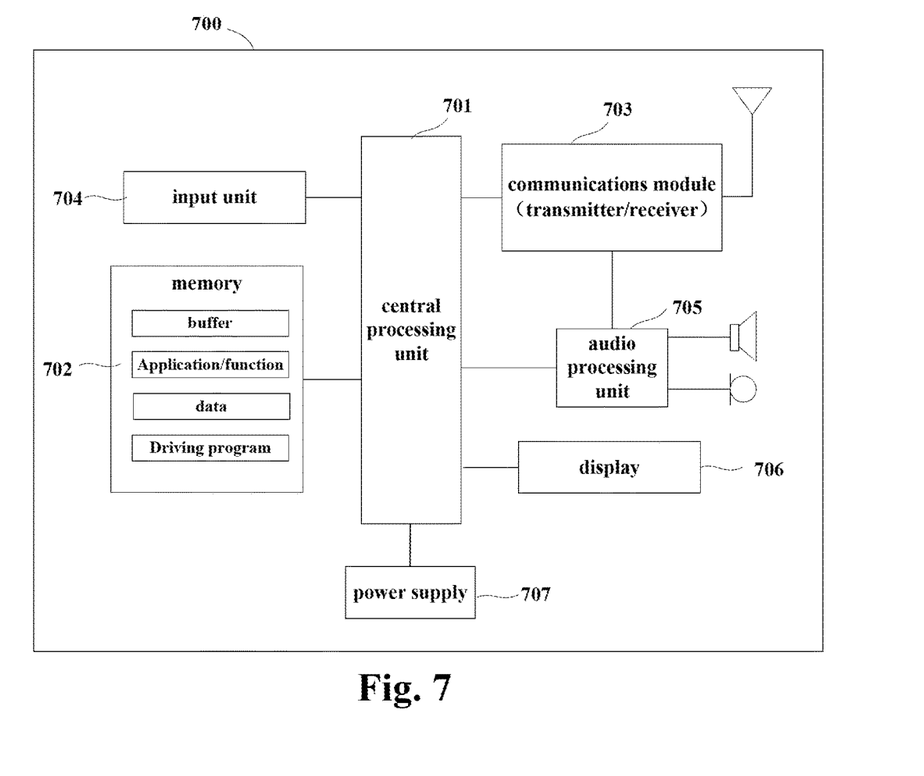
FIG. 7 is a schematic diagram of a hardware structure of the terminal device of an embodiment of this disclosure.

FIG. 7 is a schematic diagram of the terminal device of the embodiment of this disclosure. As shown in FIG. 7, a terminal device 700 may include a central processing unit 701 and a memory 702, the memory 702 being coupled to the central processing unit 701. It should be noted that this figure is illustrative only, and other types of structures may also be used, so as to supplement or replace this structure and achieve a telecommunications function or other functions.

In one implementation, the functions of the information transmission apparatus may be integrated into the central processing unit 701, and the central processing unit 701 carries out the functions of the information transmission apparatus as described in Embodiment 1. In this implementation, the central processing unit 701 may be configured to:

when the terminal is triggered to transmit information, select resources for transmitting the information from the configured first type of resource pool or second type of resource pool according to an attribute of the information; and transmit the information by using the selected resources.

Alternatively, the central processing unit is configured to: when the information is the first type of information, select the resources for transmitting the first type of information from the configured first type of resource pool, and select a predefined number of consecutive valid subframes from selectable subframe resources as the selected resources.

Alternatively, the central processing unit is configured to: when the information is the second type of information, select the resources for transmitting the second type of information from the configured second type of resource pool.

Alternatively, when resources in the first type of resource pool and resources in the second type of resource pool overlap, the resources selected from the configured second type of resource pool for transmitting the second type of information do not consecutively occupy in a time domain a predefined number of consecutive valid subframes in the first type of resource pool.

Alternatively, the central processing unit is configured to: when selecting the resources for transmitting the second type of information from the configured second type of resource pool, avoid selecting resources from the second type of resource pool occupying in the time domain a predefined number of consecutive valid subframes in the first type of resource pool.

Alternatively, the central processing unit is configured to: after the resources for transmitting the second type of information are selected from the configured second type of resource pool, when the selected resources occupy in the time domain the predefined number of consecutive valid subframes in the first type of resource pool, abandon a part of the predefined number of consecutive valid subframes.

Alternatively, the central processing unit is configured to:
receive a triggering command from an application layer, the triggering command triggering the terminal to transmit the information, and indicating whether the attribute of the information is the first type of information or the second type of information. In this implementation, the triggering command is transmitted by an application layer of the terminal, and is received by an access stratum of the terminal.

In another implementation, the information transmission apparatus and the central processing unit 701 may be configured separately. For example, the information transmission apparatus may be configured as a chip connected to the central processing unit 701, with its functions being realized under control of the central processing unit 701.

As shown in FIG. 7, the terminal device 700 may further include a communications module 703, an input unit 704, an audio processing unit 705, a display 706 and a power supply 707. It should be noted that the terminal device 700 does not necessarily include all the parts shown in FIG. 7, and furthermore, the terminal device 700 may include parts not shown in FIG. 7, and the related art may be referred to.

As shown in FIG. 7, the central processing unit 701 is sometimes referred to as a controller or control, which may include a microprocessor or other processor devices and/or logic devices, and the central processing unit 701 receives input and controls operations of every component of the terminal device 700.

In this embodiment, the memory 702 may be, for example, one or more of a buffer memory, a flash memory, a hard drive, a mobile medium, a volatile memory, a nonvolatile memory, or other suitable devices, which may store various information, and furthermore, store programs executing related information. And the central processing unit 701 may execute programs stored in the memory 702, so as to realize information storage or processing, etc. Functions of other parts are similar to those of the related art, which shall not be described herein any further. The parts of the terminal device 700 may be realized by specific hardware, firmware, software, or any combination thereof, without departing from the scope of the present disclosure.

With the terminal device of this embodiment, it may be ensured that the terminal will not miss detecting a type of information due to a semi-duplexing problem, such as detecting resources for transmitting emergency information, thereby increasing utilization of resources, and improving reliability of V2V communications.

Embodiment 3

Figure 8:
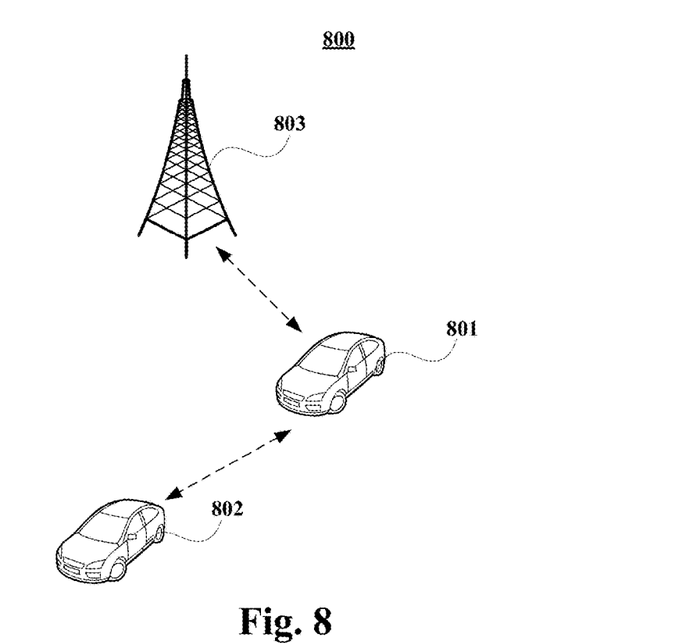
FIG. 8 is a schematic diagram of a structure of the communications system of an embodiment of this disclosure.

The embodiment of this disclosure provides a communications system. FIG. 8 is a schematic diagram of a structure of the communications system. As shown in FIG. 8, a communications system 800 includes a transmitter end 801 and a receiver end 802.

In this embodiment, the transmitter end 801 is configured with a first type of resource pool for transmitting first type of information and a second type of resource pool for transmitting second type of information, and when the transmitter end is triggered to transmit information, it selects resources from the configured first type of resource pool or second type of resource pool according to an attribute of the information, and transmits the information by using the selected resources. In this embodiment, the transmitter end 801 may be implemented by the terminal device described in Embodiment 2, the contents of which being incorporated herein, which shall not be described herein any further.

In this embodiment, after receiving the above information, the receiver end 802 makes a response according to an attribute of the information. For example, when the above information is emergency information, it makes a corresponding response according to the emergency information, and when the above information is non-emergency information, it may take the non-emergency information as a reference, which shall not be described herein any further.

In another embodiment, the receiver end 802 functions as a transmitter end of information, and may also be configured with the first type of resource pool for transmitting first type of information and the second type of resource pool for transmitting second type of information, and when the receiver end is triggered to transmit information, it selects resources from the configured first type of resource pool or second type of resource pool according to an attribute of the information, and transmits the information by using the selected resources. In this embodiment, the receiver end 802 may also be implemented by the terminal device described in Embodiment 2, the contents of which being incorporated herein, which shall not be described herein any further.

In this embodiment, as described in Embodiment 1, the above first type of resource pool and second type of resource pool may be configured by an eNB, or may be configured in advance, and a configuration manner is not limited in this embodiment.

In one implementation, as shown in FIG. 8, the communications system 800 further includes an eNB 803 configured to configure the transmitter end 801 and/or the receiver end 802 with a first type of resource pool for transmitting first type of information and a second type of resource pool for transmitting second type of information.

With the communications system of this embodiment, it may be ensured that the terminal will not miss detecting a type of information due to a semi-duplexing problem, such as detecting resources for transmitting emergency information, thereby increasing utilization of resources, and improving reliability of communications.

Embodiment 4

The embodiment of this disclosure provides an information transmission method, applicable to a terminal, such as UE1 or UE2 in the scenarios shown in FIGS. 1-3, UE1 and UE2 may be vehicles in the scenario shown in FIG. 4. In this embodiment, the terminal is configured with a first type of resource pool for transmitting first type of information and a second type of resource pool for transmitting second type of information. As principles of the method are similar to that of the apparatus in Embodiment 1, the implementation of the apparatus in Embodiment 1 may be referred to for implementation of the method, with identical contents being not going to be described herein any further.

Figure 9:
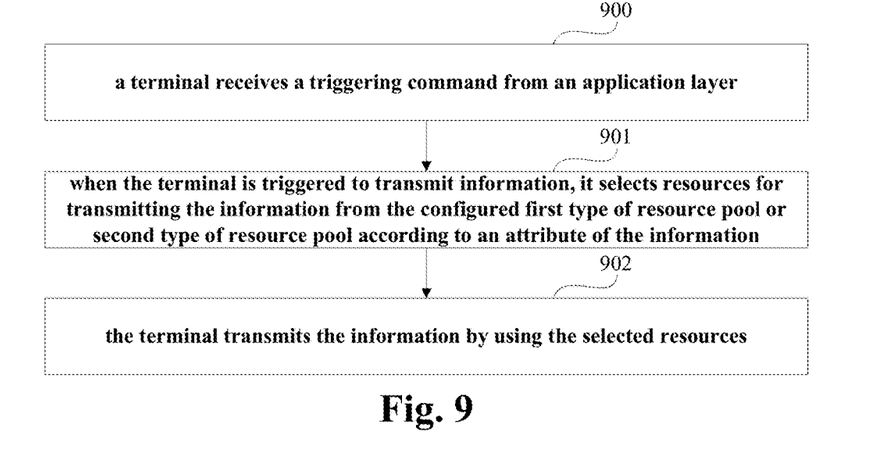
FIG. 9 is a flowchart of the information transmission method of an embodiment of this disclosure.

FIG. 9 is a flowchart of the method. As shown in FIG. 9, the method includes:

step 901: when the terminal is triggered to transmit information, it selects resources for transmitting the information from the configured first type of resource pool or second type of resource pool according to an attribute of the information; and step 902: the terminal transmits the information by using the selected resources.

In this embodiment, when the information is the first type of information, step 901 includes: the terminal selects the resources for transmitting the first type of information from the configured first type of resource pool, and selects a predefined number of consecutive valid subframes from selectable subframe resources as the selected resources.

In this embodiment, when the information is the second type of information, step 901 includes: the terminal selects the resources for transmitting the second type of information from the configured second type of resource pool.

In this embodiment, when resources in the first type of resource pool and resources in the second type of resource pool overlap, the resources selected from the configured second type of resource pool for transmitting the second type of information do not consecutively occupy in a time domain the predefined number of consecutive valid subframes in the first type of resource pool.

In one implementation of step 901, when selecting the resources for transmitting the second type of information from the configured second type of resource pool, it is avoided to select resources from the second type of resource pool occupying in the time domain the predefined number of consecutive valid subframes in the first type of resource pool.

In another implementation of step 901, after the resources for transmitting the second type of information from the configured second type of resource pool are selected, when the selected resources occupy in the time domain the predefined number of consecutive valid subframes in the first type of resource pool, a part of the predefined number of consecutive valid subframes is abandoned.

In this embodiment, as shown in FIG. 9, the method may further include:

step 900: the terminal receives a triggering command from an application layer, the triggering command triggering the terminal to transmit the information, and indicating whether the attribute of the information is the first type of information or the second type of information. In this embodiment, the triggering command is transmitted by the application layer of the terminal and received by the access stratum of the terminal.

With the method of this embodiment, it may be ensured that the terminal will not miss detecting a type of information due to a semi-duplexing problem, such as detecting resources for transmitting emergency information, thereby increasing utilization of resources, and improving reliability of communications.

An embodiment of the present disclosure provides a computer readable program, which, when executed in an information transmission apparatus or a terminal device, will cause a computer unit to carry out the information transmission method described in Embodiment 4 in the information transmission apparatus or terminal device.

An embodiment of the present disclosure provides a computer storage medium, including a computer readable program, which will cause a computer unit to carry out the information transmission method described in Embodiment 4 in an information transmission apparatus or a terminal device.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An information transmission apparatus, applicable to a terminal, the terminal being configured with a first type of resource pool for transmitting first type of information and a second type of resource pool for transmitting second type of information, the apparatus comprising:
 a memory configured to store a plurality of instructions;
 processor circuitry coupled to the memory, wherein the processor circuitry is configured to:
 select resources, when the terminal is triggered to transmit information, for transmitting the information from the configured first type of resource pool or second type of resource pool according to an attribute of the information; and transmit the information by using the selected resources,
select the resources for transmitting the first type of information from the configured first type of resource pool, when the information is the first type of information, and select a predefined number of consecutive valid subframes from selectable subframe resources as the resources for transmitting the first type of information,
select the resources for transmitting the second type of information from the configured second type of resource pool, when the information is the second type of information,
wherein when resources in the first type of resource pool and resources in the second type of resource pool overlap, the resources selected by the processor circuitry from the configured second type of resource pool for transmitting the second type of information do not consecutively occupy in a time domain the predefined number of consecutive valid subframes in the first type of resource pool.

2. The apparatus according to claim 1, wherein the processor circuitry is configured to
receive a triggering command from an application layer, the triggering command triggering the terminal to transmit the information, and indicating whether the attribute of the information is the first type of information or the second type of information.

3. An information transmission method, applicable to a terminal, the terminal being configured with a first type of resource pool for transmitting first type of information and a second type of resource pool for transmitting second type of information, the method comprising:
selecting, when the terminal is triggered to transmit information, resources for transmitting the information from the configured first type of resource pool or second type of resource pool according to an attribute of the information; and
transmitting the information by using the selected resources,
wherein when the information is the first type of information, the step of selecting resources comprises:
selecting the resources for transmitting the first type of information from the configured first type of resource pool, and selecting a predefined number of consecutive valid subframes from selectable subframe resources as the resources for transmitting the first type of information,
wherein when the information is the second type of information, the step of selecting resources comprises:
selecting the resources for transmitting the second type of information from the configured second type of resource pool,
wherein when resources in the first type of resource pool and resources in the second type of resource pool overlap, the resources selected from the configured second type of resource pool for transmitting the second type of information do not consecutively occupy in a time domain the predefined number of consecutive valid subframes in the first type of resource pool.

4. The method according to claim 3, wherein when selecting the resources for transmitting the second type of information from the configured second type of resource pool, it is avoided to select resources from the second type of resource pool occupying in the time domain the predefined number of consecutive valid subframes in the first type of resource pool.

5. The method according to claim 3, wherein after the resources for transmitting the second type of information are selected from the configured second type of resource pool, when the selected resources occupy in the time domain the predefined number of consecutive valid subframes in the first type of resource pool, a part of the predefined number of consecutive valid subframes is abandoned.

6. The method according to claim 3, wherein the method further comprises:
receiving a triggering command from an application layer, the triggering command triggering the terminal to transmit the information, and indicating whether the attribute of the information is the first type of information or the second type of information.

7. The apparatus according to claim 6, wherein when the apparatus selects the resources for transmitting the second type of information from the configured second type of resource pool, it avoids selecting resources from the second type of resource pool occupying in the time domain the predefined number of consecutive valid subframes in the first type of resource pool.

8. The apparatus according to claim 6, wherein after the resources for transmitting the second type of information are selected from the configured second type of resource pool, when the selected resources occupy in the time domain the predefined number of consecutive valid subframes in the first type of resource pool, the processor circuitry abandons a part of the predefined number of consecutive valid subframes.

9. A communications system, comprising a transmitter end and a receiver end, wherein,
the transmitter end is configured with a first type of resource pool for transmitting first type of information and a second type of resource pool for transmitting second type of information, and when the transmitter end is triggered to transmit information, it selects resources from the configured first type of resource pool or second type of resource pool according to an attribute of the information, and transmits the information by using the selected resources,
wherein when the information is the first type of information, the transmitter end selects the resources for transmitting the first type of information from the configured first type of resource pool, and selects a predefined number of consecutive valid subframes from selectable subframe resources as the resources for transmitting the first type of information,
wherein, when the information is the second type of information, the transmitter end selects the resources for transmitting the second type of information from the configured second type of resource pool,
wherein when resources in the first type of resource pool and resources in the second type of resource pool overlap, the resources selected by the transmitter end from the configured second type of resource pool for transmitting the second type of information do not consecutively occupy in a time domain the predefined number of consecutive valid subframes in the first type of resource pool.

10. The communications system according to claim 9, wherein the receiver end is also configured with the first type of resource pool for transmitting first type of information and the second type of resource pool for transmitting second type of information, and when the receiver end is triggered to transmit information, it selects resources from the configured first type of resource pool or second type of resource pool according to an attribute of the information, and transmits the information by using the selected resources.

11. The communications system according to claim 9, wherein the system further comprises:
   an eNB configured to configure the transmitter end and/or the receiver end with a first type of resource pool for transmitting first type of information and a second type of resource pool for transmitting second type of information.

* * * * *